Figure 1:
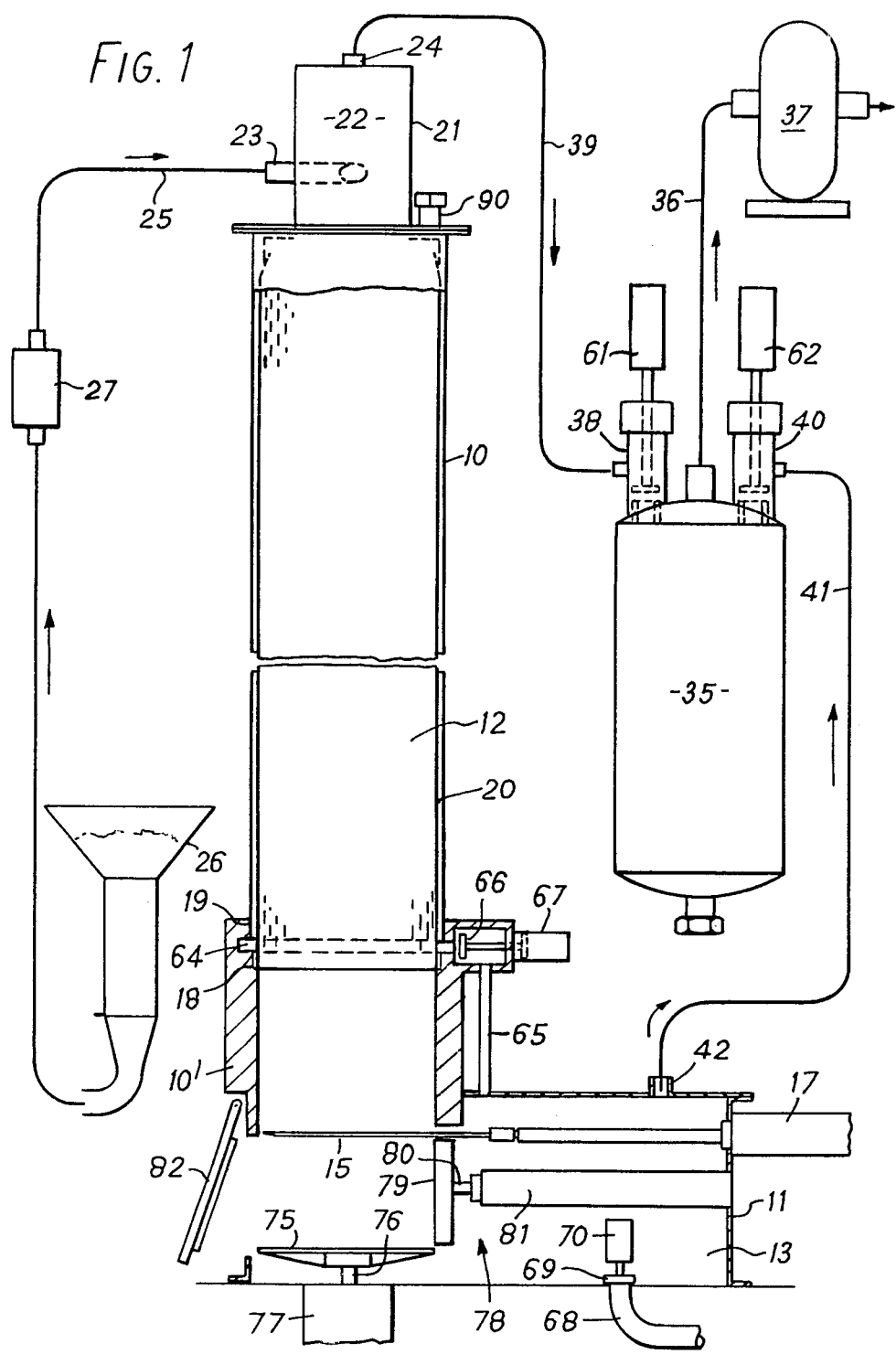

United States Patent [19]

Charles

[11] 4,237,781

[45] Dec. 9, 1980

[54] METHOD AND APPARATUS FOR FORMING BLOCKS OF NATURAL CHEESE FROM CHEESE CURD

[75] Inventor: George K. Charles, Wincanton, England

[73] Assignee: Alfa Laval AB, Tumba, Sweden

[21] Appl. No.: 28,803

[22] Filed: Apr. 10, 1979

[30] Foreign Application Priority Data

Apr. 20, 1978 [GB] United Kingdom ............... 15749/78

[51] Int. Cl.³ .................... A23C 19/02; A01J 25/11
[52] U.S. Cl. ........................................ 99/454; 99/458; 99/459
[58] Field of Search .................................. 99/452-454, 99/456, 458, 459, 465; 426/486, 478, 491, 517

[56] References Cited

U.S. PATENT DOCUMENTS

| | | | |
|---|---|---|---|
| 3,468,026 | 9/1969 | Robertson et al. ..................... | 99/454 |
| 4,061,794 | 12/1977 | Charles .................................. | 426/486 |
| 4,137,836 | 2/1979 | Megard .................................. | 99/456 |
| 4,157,680 | 6/1979 | Charles .................................. | 99/454 |

Primary Examiner—Harvey C. Hornsby
Assistant Examiner—Timothy F. Simone
Attorney, Agent, or Firm—Browdy and Neimark

[57] ABSTRACT

Crumbled cheese curd is fed into the top of a hollow perforated column in a chamber maintained at a subatmospheric pressure so as to form in the column a pillar of curd devoid of air pockets, the curd in the lower portion of the pillar being compressed by the weight of superimposed curd to press out whey therefrom and consolidate the curd, the whey passing through the perforations in the wall of the column, and the pillar of curd is repeatedly lowered, the bottom end of the pillar severed to form a block of cheese, and fresh curd added to the top of the pillar. During the lowering of the pillar of curd, the gaseous pressure in the space between the column and the wall of the chamber is increased so as to effect a transverse compression of the pillar of curd and thereby reduce the frictional sliding resistance between the pillar of curd and the column.

2 Claims, 2 Drawing Figures

METHOD AND APPARATUS FOR FORMING BLOCKS OF NATURAL CHEESE FROM CHEESE CURD

This invention relates to cheese-making, and is concerned more particularly with the formation of blocks of compressed natural cheese from cheese curd in the production of cheddar round eyed or other variety of hard or soft cheese.

An increasing volume of cheese is being manufactured commercially by cutting cheese curd in a curd mill into small pieces, cubes, slices or chips or by breaking up the curd into granular form by continuous stirring in a vat, mixing the cut or granular curd with salt and any other desired additive to form a mixture which will hereinafter be referred to for convenience as prepared cheese curd, compressing the prepared curd to expel whey and air and cause the particles of curd to fuse together and form a block of natural cheese, wrapping the block in impervious sheet material, and then maturing the cheese under pressure. The conventional method of forming the prepared cheese curd into blocks of natural cheese is by compressing the curd in individual moulds, but the filling, weighing, compressing and emptying of each mould is a time-consuming operation, and a large number of moulds and presses are required for large scale production.

British Patent Specification No. 1,187,964 discloses a method of forming blocks of cheese from prepared cheese curd, which avoids the use of individual moulds. This method comprises feeding the prepared curd into a hollow perforated column in a chamber so as to form a pillar of curd in the column, the curd in the lower portion of the pillar being compressed by the weight of superimposed curd to press out whey through the perforations in the column, extracting air and whey from the chamber so as to maintain a sub-atmospheric pressure therein during feeding of the curd into the chamber whereby air introduced into the chamber with the curd is "flashed off" before the curd is deposited on top of the pillar, lowering the pillar of curd in the column so that the lower end of the pillar of curd projects through the bottom of the column, severing the lower end of the pillar to form a block of cheese, removing the block of cheese from the chamber and continuing the feeding, lowering, and severing operations. This method will hereinafter be referred to for convenience as the method of forming blocks of cheese from prepared cheese curd using a perforated column in a chamber at a sub-atmospheric pressure.

The apparatus described in Specification 1,187,964 comprises a platform for supporting the pillar of curd, and in operation the pillar of curd slides down the column when the platform is lowered. It was found however that the frictional resistance between the pillar of curd and the walls of the column was sometimes high enough to cause fractures in the pillar of curd when it was lowered in the column.

According to the present invention there is provided a method of forming blocks of cheese from prepared cheese curd using a perforated column in a chamber at a sub-atmospheric pressure, wherein the gaseous pressure in the space between the column and the wall of the chamber is increased during the lowering of the pillar of curd so as to effect a transverse compression of the pillar of curd and thereby reduce the frictional sliding resistance between the pillar of curd and the column, the pressure in the chamber being subsequently reduced to said sub-atmospheric pressure prior to the next feeding operation. The pressure in the chamber is preferably increased to atmospheric pressure during the lowering of the pillar of curd.

In the method of the invention the increase in pressure in the chamber during the lowering of the pillar of curd compresses and consolidates the curd so as to effect a slight reduction in the cross sectional dimensions of the pillar which is thereby eased away from the perforations in the wall of the column. The frictional sliding resistance between the pillar of curd and the wall of the column is thus appreciably reduced, thereby reducing the risk of fracture of the pillar of curd when it is being lowered within the column.

The pillar of curd is preferably formed in a first chamber superimposed on a second chamber and communicating therewith through a passageway, the bottom of the pillar of curd passing through the passageway during the lowering operation, and the curd in the passageway being forced by the weight of the superimposed curd against the walls of the passageway and forming a seal between the two chambers. A guillotine blade in the second chamber is operable to close the passageway and sever the bottom portion of the pillar of curd in the second chamber to form a block of cheese.

The first and second chambers are maintained at a subatmospheric pressure during feeding of curd into the column. During the lowering operation, the first and second chambers may be maintained substantially at atmospheric pressure, or alternatively the first chamber may be maintained at atmospheric pressure and the second chamber at a lower pressure whereby the differential pressure between the two chambers exerts a force on the pillar of curd urging the pillar downwards.

During the formation of the pillar of curd the absolute pressure in the first chamber would depend on the variety of cheese being made and the closeness of the body of the cheese. By the use of a suitable low pressure within the first chamber, almost all the air can be removed from the curd before it is compressed in the pillar, so that the blocks of cheese will be free of air pockets.

The blocks of cheese are preferably further compressed after being severed from the lower end of the pillar, in order to overcome the elasticity of the particles of curd and produce a smoother outer surface to the block of cheese.

British Patent Specification No. 1,542,844 describes a method of forming blocks of cheese from prepared cheese curd using a perforated column mounted in an upper chamber superimposed on a lower chamber, the lower end of the column opening into the lower chamber. In operation, the upper chamber is maintained at a sub-atmospheric pressure which is nevertheless higher than the pressure in the lower chamber during the lowering of the pillar of curd whereby the differential pressure between the two chambers exerts a force on the top of the pillar urging the pillar downwards. The increased pressure in the upper chamber does not however exist in the space between the column and the walls of the upper chamber for the reason that this space, which is very narrow, is connected to the lower chamber through a drainage duct having a flap valve opening in the direction of flow from the upper chamber to the lower chamber.

Figure 2:
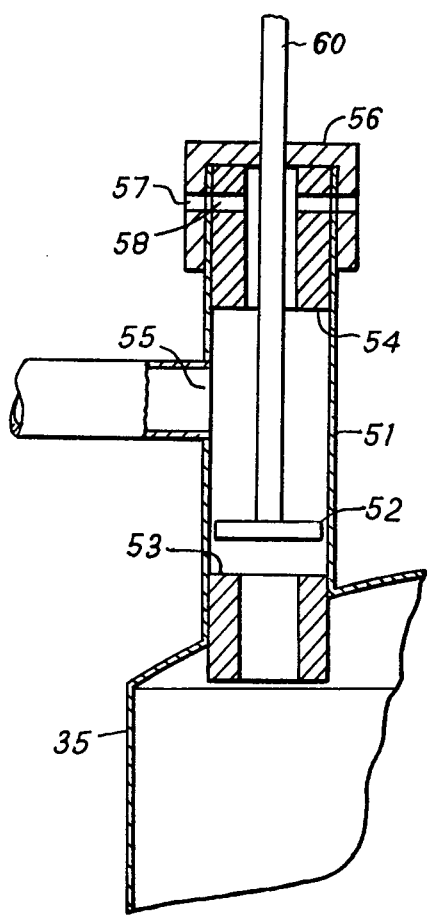

One construction of apparatus suitable for carrying out the method of the invention will now be described, by way of example, with reference to the accompanying drawings, in which:

FIG. 1 is a diagrammatic view of the apparatus, and
FIG. 2 is a sectional view of a vacuum control valve of the apparatus.

Referring to FIG. 1, the apparatus comprises a hollow casing 10 of rectangular section mounted on a hollow casing 11, the lower end portion $10^1$ of the casing 10 having a thicker wall than the remainder of the casing and opening into the interior of the casing 11. The interior of the casing 10 forms an upper vacuum chamber 12 and the interior of the casing 11 forms a lower vacuum chamber 13. A guillotine blade 15 is mounted in guides (not shown) on the lower end of the casing 10, within the chamber 13, the blade being movable by a piston and cylindermotor 17 between a closed position in which it closes off the upper chamber 12 from the lower chamber 13, and an open position in which it is withdrawn wholly clear of the lower end of the upper chamber. The upper end of the thick walled portion $10^1$ of the casing 10 has a stepped formation forming a section 18 of slightly larger internal diameter than that of the remainder of the thick walled portion, and another section 19 above section 18 and of slightly larger internal diameter than that of the section 18. The remainder of the thick walled portion $10^1$ has a smooth internal surface.

A thin-walled tubular column 20 of rectangular section is mounted in the upper chamber 12 with its lower end a close fit against the lower section 18 of the thick walled portion $10^1$, and a cyclone separator 21 is mounted on the upper end of the column and projects upwards through an opening in the top of the casing 10, the cyclone separator being a fluid tight fit in the opening in the casing. The walls of the column 20 are perforated and co-operate with the casing 10 fo form therebetween a space for drainage of liquid, and the thickness of the walls of the column are such that the inside surface of the column is flush with the inside surface of the thick walled portion $10^1$ below the sections 18, 19 thereof. The walls of the column can conveniently be formed by perforated liners on the inside wall of the casing 10. The liners may consist of thin stainless steel sheets, each sheet having small elongated strips punched out of the plane of the sheet to form two narrow slots on each side of each strip with the ends of the strips merging smoothly into the body of the sheet, as described in British Patent Specification No. 1,541,836. The sheets are arranged so that the strips are vertical and project from the outside surfaces of the sheets. The inside surfaces of the walls of the column 20 are thus smooth and unobstructed by any inwardly extending projections, and the strips space the body of the sheet from the casing 20 to provide the drainage space. The parts of the sheets forming the lower edge of the column are unperforated so that the sheets engage flat against the section 18 of the thick walled portion $10^1$.

The cyclone separator is for use in feeding curd into the column 20 and comprises an upright cylindrical chamber 22 and a curd inlet pipe 23 which opens into the chamber 22 tangentially through the wall thereof. The bottom of the chamber 22, which opens into the interior of the column 20, is fitted to a rectangular section adapted to fit on a tapered mouth on the top of the column. The top of the chamber 22 has an outlet 24 through which air can be evacuated from the separator and the column.

The curd inlet pipe 23 is connected by a flexible pipe 25 to the outlet of a hopper 26 for storing curd to be fed to the column, the pipe 25 containing a valve 27 for controlling feed of the curd.

A large vacuum reservoir 35 is connected directly by a pipe 36 to a power driven exhauster 37 operable to maintain the reservoir at a high vacuum, and the reservoir is also connected through a control valve 38 and a pipe 39 to the air outlet 24 of the cyclone separator 21 and through a control valve 40 and a pipe 41 to an air outlet 42 for the lower chamber 13. The two control valves 38, 40 are of identical construction and as shown in FIG. 2 each comprises a cylinder 51 and a valve piston 52 adapted to make sealing engagement selectively with valve seats 53, 54 at the lower and upper ends respectively of the cylinder, the centre portion of the cylinder having a port 55 connected to the pipe 39 or 41, the lower end of the cylinder being connected to the vacuum reservoir through the valve seat 53, and the upper end of the cylinder being connected to atmosphere through the valve seat 54. The upper end of the cylinder 51 is fitted with a cap 56 having a plurality of ports 57 adapted to be aligned with ports 58 in the cylinder wall, the ports 57 being graduated in size so that the rate of flow of air through the valve seat 54 can be regulated by angular adjustment of the cap. The valve piston 52 is secured to a piston rod 60 which extends through the valve seat 54 and through an aperture in the cap 56 and is connected to an air motor 61 or 62 (FIG. 1) operable to move the piston 52 alternately against the valve seats 53, 54 so that the port 55 is connected to the vacuum reservoir when the piston is engaged against the valve seat 54 and the port 55 is connected to atmosphere through ports 57, 58 when the piston is engaged against the valve seat 53.

The section 19 of the thick walled portion $10^1$ of the upper casing 10 is formed with a drainage gallery 64 which communicates with the space between the column 20 and the casing 10, and a drain pipe 65 from the gallery opens into the chamber 13. Flow of fluid through the drain pipe 65 is controlled by a valve 66 actuated by a piston and cylinder motor 67. The bottom wall of the casing 11 is fitted with a drain passage 68 controlled by a valve 69 actuated by a piston and cylinder motor 70.

The lower chamber 13 is provided with a platform 75 positioned directly below the column 20. The platform is mounted on the piston rod 76 of a vertical piston and cylinder motor 77 operable to raise and lower the platform. The lower chamber is also provided with an ejector 78 consisting of a flat plate 79 mounted on the end of a piston rod 80 of a horizontal piston and cylinder motor 81 operable to move the disc across the platform so as to eject a block of cheese thereon through a door 82 in the end wall of the lower casing 11.

At the start of an operational cycle of the apparatus, the curd feed pipe 25 is closed by valve 27, the upper chamber 12 is sealed from the lower chamber 13 by the guillotine blade 15 which is in the closed position shown in FIG. 1, the door 82 in the casing 11 is closed, the drain passage 68 in the lower casing 11 is closed by valve 69, the control valves 38, 40 are each set so that their valve pistons 52 are engaged against the upper valve seats 54 so that both the chambers 12, 13 are connected to the vacuum reservoir 35, the piston of valve 66 is held off its seat by motor 67, and the exhauster 37 is driven to evacuate air from the reservoir and the two chambers 12, 13. The hopper is filled with a mixture of cheese curd and salt.

When a high vacuum is obtained in the two chambers 12, 13, the valve 27 is opened so that the difference between the low pressure in the chamber 12 and the comparatively high atmospheric pressure acting on the curd in the hopper causes the curd to flow up the pipe 25 and into the cyclone separator 21. The curd entering the cyclone separator is of course immediately subjected to the low pressure therein and some of the moisture in the curd is "flashed off" into vapour and withdrawn from the separator, together with air entering with the curd, through the pipe 39.

The cheese curd falls from the separator into the column 20 and builds up into a pillar of curd supported on the guillotine blade 15. The weight of curd in the column compresses the curd at the lower end and forces whey out of the curd, the whey passing through the slots in the walls of the column into the space between the column and the casing 10 and the whey then draining into the gallery 64.

As a result of the continuous induction of air carrying the curd, chamber 12 tends to remain at a slightly higher pressure than chamber 13. Some air is therefore caused to flow continuously downwards between the walls of the column 20 and casing 10, into the gallery 64, through valve 66 and drain pipe 65 into chamber 13. This flow of air sweeps whey from the slots in the walls of column 20 and carries it into chamber 13. The drainage slots in the walls of the column are thus kept free from accumulations of moisture and a drying effect is created on these surfaces which assists the exudation of whey from the column of curd.

The column is provided with control mechanism operable to close valve 27 to cut off the supply of curd whenever the pillar of curd reaches a predetermined height.

When the pillar of curd has reached the predetermined height, the platform 75 in the lower chamber 13 is raised to a position in which it is immediately below the guillotine blade 15 and the motor 61 of control valve 38 is operated to move the valve piston from the upper seat 54 into engagement with the lower seat 53 and thereby permit air to flow through the pipe 39 into the chamber 12. At the same time motor 67 is operated to close valve 66 so as to shut off communication between chambers 12 and 13. The resulting increase in pressure in the chamber 12 compresses and consolidates the curd in the pillar. Since the build up of the pillar took place at low pressure there is little or no air inside the pillar and any small cavities which may exist are maintained mainly by the slight but declining elasticity of the curd particles. The increased pressure in chamber 12 is of course common to the space between the walls of the column 20 and casing 10, where acting on all four vertical faces of the column it has the effect of slightly reducing the cross section of the pillar of curd which is thereby eased away from the drainage slots. The section of curd in the non-perforated portion $10^1$ of the casing between the gallery 64 and guillotine 15 is not subjected to this lateral compression and remains in close contact with the smooth walls of the casing to form a reasonably airtight seal between chambers 12 and 13.

When blade 15 is withdrawn the pillar of curd within the column comes to rest on platform 75. The platform together with the pillar of curd is then lowered slowly by the motor 77 to the position shown in FIG. 1. During the downward movement of the platform the whole mass of curd is forced downwards against the platform 75 not only by gravity but also by the air pressure in chamber 12 acting on the curd as on a piston in a cylinder. The action is greatly enhanced by the squeezing effect of the air admitted to the space between plates 20 and casing 10 so that the consolidated column of curd is in effect extruded through the smooth passageway formed by portion $10^1$ into the low pressure of chamber 13. By equalizing the air pressure on all sides of the column of curd in contact with the perforated drainage plates a definite release action is achieved which ensures the smooth and intact lowering of the pillar of curd and that there is no risk of the pillar of curd fracturing due to the frictional resistance between the curd and the walls of the column. The pressure in the chamber 12 can conveniently be increased to, or close to, atmospheric pressure prior to and during the lowering of the pillar of curd.

When the platform is in its lowered position the guillotine blade is driven into its closed position as shown in FIG. 1, thereby severing a block of curd from the lower end of the pillar of curd. Although the curd in the block has been compressed by the weight of the superimposed curd in the column and by the increased pressure of air in the column when connected to atmosphere, the block of curd is compressed further by forcing the platform upwards and compressing the block against the underside of the blade 15. The curd can thus be compressed to any desired degree by use of a suitable size of motor 77.

After compressing the block of curd for a predetermined time (for example 30–60 seconds), the platform is lowered to space the block from the blade 15, the control valve 40 is operated by the motor 62 to disconnect the pipe 41 from the vacuum reservoir and connect it instead to atmosphere. Also, the valve 69 is opened to increase the rate of supply of air to chamber 13. When the pressure in the chamber 13 has risen to atmospheric pressure, the block of curd is removed through the door 82 by the ejector 78. At this stage, whey which has entered the lower chamber 13 through the drain pipe 65 drains away through the drain passage 68. The ejector is then retracted, the door 82 and valve 69 are closed, the two control valves 38, 40 operated to connect the two chambers 12, 13 to the vacuum reservoir, and the cycle repeated.

Although the pressure in the chamber 13 is preferably maintained at a lower pressure than that in chamber 12 during the lowering of the pillar of curd so that the differential pressure exerts a downward thrust on the pillar, the chambers 12 and 13 can if desired be maintained at the same pressure during the lowering of the pillar provided that the pressure is sufficient to reduce the frictional resistance between the pillar of curd and the column, by lateral compression of the pillar, to a value at which there is little or no risk of fracture of the pillar. The pressures in the chambers 12 and 13 can conveniently be increased to, or close to, atmospheric pressure prior to and during the lowering of the pillar of curd.

It will of course be appreciated that the control valves and motors can be operated automatically in sequence by suitable control mechanism in each operational cycle of the apparatus.

I claim:

1. Apparatus for forming blocks of cheese from prepared cheese curd, comprising a casing defining an upper chamber, a lower chamber directly below the upper chamber, and an opening between the two chambers, a hollow column mounted in the upper chamber above said opening, the wall of said column being formed with apertures at least in the lower portion thereof, a guillotine blade movable between an open position and a closed position closing off said opening, vacuum means for creating a sub-atmospheric pressure in the two chambers, means for introducing prepared cheese curd into the upper end of the column to form a pillar of curd therein supported on the guillotine blade in the closed position while the upper chamber is maintained at a sub-atmospheric pressure, means for removing from the upper chamber whey expressed from the lower end portion of the pillar of curd through the apertures in the column due to the weight of curd superimposed thereon, means for lowering the pillar of curd in the column upon retraction of the guillotine blade into the open position so that the lower end portion of the pillar of curd extends into the lower chamber, the guillotine blade being adapted to cut a block of cheese from the lower end of the pillar of curd upon movement of the guillotine blade into the closed position, and means for removing the block from the lower chamber, wherein the said opening between the two chambers comprises a smooth walled passageway the surfaces of which are flush with the internal surfaces of the column in the upper chamber, the means for removing whey from the upper chamber comprises a drainage duct connected to vacuum means and fitted with a drain valve operable selectively to open and close the duct, and means are provided for admitting air to the upper chamber while said drain valve is closed to increase the pressure and effect lateral compression of the pillar of curd.

2. Apparatus as claimed in claim 1, in which the column is formed of perforated sheets attached to the walls of the casing, at least the unperforated portions of the sheets being spaced from the walls of the upper chamber to form a space for drainage of whey expressed from the curd in the column, wherein said means for removing whey from the upper chamber comprises a gallery in the upper end of said passageway, the gallery communicating with the space between said plates and the walls of the upper chamber, and the drainage duct extending from the gallery to the lower chamber.

* * * * *